(12) United States Patent
Casella et al.

(10) Patent No.: US 6,219,803 B1
(45) Date of Patent: Apr. 17, 2001

(54) TESTING AND DEBUGGING TOOL FOR NETWORK APPLICATIONS

(75) Inventors: Stephen R. Casella, Amherst; Robert L. Bardani, Jr.; David M. Swan, both of Nashua, all of NH (US)

(73) Assignee: Progress Software Corporation, Bedford, MA (US)

( * ) Notice: Subject to any disclaimer, the term of this patent is extended or adjusted under 35 U.S.C. 154(b) by 0 days.

(21) Appl. No.: 09/107,499

(22) Filed: Jun. 30, 1998

Related U.S. Application Data

(60) Provisional application No. 60/051,501, filed on Jul. 1, 1997.

(51) Int. Cl.[7] .................................................. G06F 11/00
(52) U.S. Cl. ............................................ 714/38; 713/201
(58) Field of Search ................................ 714/38, 4, 39, 714/40, 47, 2, 18, 25, 26, 3; 713/200, 201, 202; 709/227, 203, 224

(56) References Cited

U.S. PATENT DOCUMENTS

| | | |
|---|---|---|
| 4,720,850 | 1/1988 | Oberlander . |
| 4,894,829 | 1/1990 | Monie et al. ........................ 371/20.1 |
| 5,331,642 | 7/1994 | Valley et al. ........................... 371/5.2 |
| 5,428,740 | 6/1995 | Wood et al. ........................... 395/161 |
| 5,623,600 * | 4/1997 | Ji et al. ............................ 395/187.01 |
| 5,623,601 * | 4/1997 | Vu ..................................... 395/187.01 |
| 5,673,322 * | 9/1997 | Pepe et al. .............................. 380/49 |
| 5,706,507 | 1/1998 | Schloss ................................. 395/615 |
| 5,708,654 * | 1/1998 | Arndt et al. .......................... 370/242 |
| 5,727,654 | 3/1998 | Kikinis ............................. 395/200.76 |
| 5,754,774 * | 5/1998 | Bittinger et al. ................. 395/200.33 |
| 5,774,670 | 6/1998 | Montulli ........................... 395/200.57 |
| 5,805,803 * | 9/1998 | Birrel et al. ..................... 395/187.01 |
| 5,870,559 * | 2/1999 | Leshem et al. .................. 395/200.54 |
| 5,892,903 * | 4/1999 | Klaus ................................ 395/187.01 |
| 5,915,087 * | 6/1999 | Hammond et al. ............. 395/187.01 |
| 5,918,018 * | 6/1999 | Gooderum et al. ............. 395/200.55 |
| 5,941,988 * | 8/1999 | Bhagwat et al. ...................... 713/201 |
| 5,983,350 * | 11/1999 | Minear et al. ........................ 713/201 |
| 6,003,084 * | 12/1999 | Green et al. .......................... 709/227 |
| 6,085,243 * | 7/2000 | Fletcher et al. ....................... 709/224 |

\* cited by examiner

*Primary Examiner*—Nadeem Iqbal
(74) *Attorney, Agent, or Firm*—Weingarten, Schurgin, Gagnebin & Hayes LLP

(57) ABSTRACT

A software development tool permits capture, modification and recording of transactional messages that are transmitted between a client and a server in a computer network. A proxy is employed to capture messages such as requests and responses that are in transit between the client and the server. The captured requests and responses can be displayed and modified before being retransmitted via the proxy. Further, transaction records can be selectively provided to at least one software application for analysis.

18 Claims, 2 Drawing Sheets

TESTING AND DEBUGGING TOOL FOR NETWORK APPLICATIONS

CROSS REFERENCE TO RELATED APPLICATIONS

Priority is claimed to U.S. Provisional Patent Application Serial. No. 60/051,501 entitled TESTING AND DEBUGGING TOOL, filed Jul. 1, 1997.

STATEMENT REGARDING FEDERALLY SPONSORED RESEARCH OR DEVELOPMENT

Not Applicable.

BACKGROUND OF THE INVENTION

The present invention is related to software development tools, and more particularly to testing and debugging tools for network applications.

Testing and debugging tools that facilitate software development are known. However, known testing and debugging tools are generally not well suited for use with network applications such as internet web sites. Testing and debugging tools are typically operative with only one programming language. However, the software employed by an internet web site and browser may comprise a plurality of programming languages. Testing and debugging tools are designed to be employed prior to deployment of the application under development. However, the behavior of a network application following deployment in a "real" environment is often different than the behavior of the application in the development environment.

BRIEF SUMMARY OF THE INVENTION

In accordance with the present invention, a software development tool permits capture, modification and recording of transactions between a client and a server in a computer network. The tool is situated in a communication path between the client and the server. A protocol-specific proxy is employed to capture data units that are associated with the transaction when the data units are transmitted between the client and the server. The transaction is displayed and optionally modified en route between the client and the server. Further, transaction records are selectively provided to at least one software application for analysis. The supported protocols may include TCP/IP protocols such as HTTP, FTP, SMTP, POP3 and IMAP4.

Selectively capturing and modifying data units between the client and the server enables useful features such as tracing and isolating transactions between the client and server. It is also possible to debug a deployed application, debug the internal interactions of a browser application by employing inbound and outbound streams, preview data units that the client device will receive from the server device, and set breakpoints and watch variables to selectively interrupt transactions. Advantages related to security and performance concerns about applets and components that instantiate in a browser application include enumeration of methods, fields and interfaces in a class prior to activation in the browser, enumeration of methods, properties and events in an ActiveX type library prior to activation in the browser, opening a CAB file prior to activation in the browser, and logging an "on-the-wire" transaction.

BRIEF DESCRIPTION OF THE SEVERAL VIEWS OF THE DRAWING

The foregoing features of this invention, as well as the invention itself, may be more fully understood from the following Detailed Description of the Invention, and Drawing, of which.

DETAILED DESCRIPTION OF THE INVENTION

U.S. Provisional Patent Application Serial No. 60/051, 501 entitled TESTING AND DEBUGGING TOOL, filed Jul. 1, 1997 is incorporated herein by reference.

Figure 1:
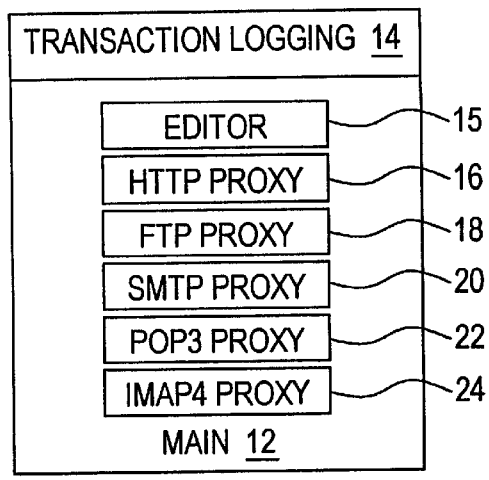
FIG. 1 is a block diagram of the testing and debugging tool.

Referring to FIG. 1, a testing and debugging tool 10 for network applications includes a main application 12 and a transaction logging application 14. The main application contains an editor 15 and a plurality of TCP/IP protocol proxies including an HTTP proxy 16, an FTP proxy 18, an SMTP proxy 20, a POP3 proxy 22 and an IMAP4 proxy 24 in the illustrated embodiment.

Figure 2:
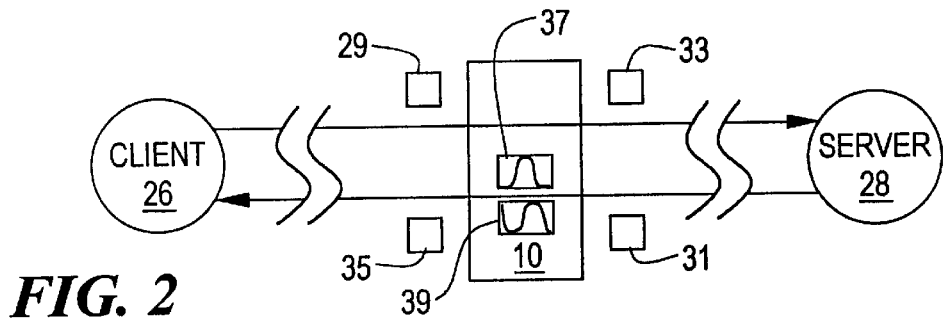
FIG. 2 is a block diagram that illustrates capture and modification of data units.

Referring to FIG. 2, the testing and debugging tool 10 is situated in a communication path between a selected client device 26 and a selected server device 28. The entire communication path, including the client 26, server 28 and testing and debugging tool 10, may exist on a single computer device or, as illustrated, on multiple computer devices and interconnecting media. The server device 28 is selected by specifying a DNS name or IP address that is associated with the server device. The client device 26 is selected by specifying a DNS name or IP address that is associated with the client device. Alternatively, the source address of the client can be snooped from a request 29 that is transmitted from the client 26 to the server 28 via the testing and debugging tool 10. In a connection between the client 26 and the server 28, the IP address of the testing and debugging tool 10 is employed for communications from the client 16 to the testing and debugging tool 10, and the IP address of the server 28 is employed for communication from the testing and debugging tool 10 to the server 28. Similarly, the IP address of the testing and debugging tool 10 is employed for communications from the server 28 to the testing and debugging tool 10, and the IP address of the client 26 is employed for communications from the testing and debugging tool 10 to the client 26. The DNS name or IP address of the server 28 is not required for the HTTP protocol. A destination identifier is extracted from the requested URL when HTTP is employed. A specified 32-bit signed numeric value indicates the port which the testing and debugging tool monitors for a connection from the client 26.

In a passive mode, transactions are monitored by the testing and debugging tool 10 without interrupting transmission between the client 26 and the server 28. The monitoring function may include display of transaction records. In the illustrated embodiment, a representation of requests 29, responses 31, and both the IP address and DNS name that are being employed by the active proxy are displayed.

Transaction requests 29 and responses 31 can also be captured and modified in the passive mode. In particular, the captured data units may be modified and then transmitted to the original destination. In the illustrated embodiment, request 29 would be modified to provide request 33, which is transmitted to server 28. Similarly, response 31 would be modified to provide response 35, which is transmitted to client 26. The testing an debugging tool may be equipped with an editor to facilitate modification of transactional data. Further, modifications can be automated for operation upon multiple transactions.

A breakpoint condition can be specified under which the tool will interrupt transactions. In the illustrated example, transactions such as requests and responses are monitored and logged in the passive mode until a breakpoint condition is satisfied. The tool then enters a break mode in which the triggering transaction is interrupted. The request or response that comprises the triggering transaction is then presented to the user for viewing and editing. The user can choose to remain in the break mode and intercept subsequent requests and responses, or exit the break mode and monitor transactions until another breakpoint condition occurs. If the breakpoint occurs during a request, a response can be composed with the tool and sent to the client, thereby circumventing the server. Breakpoints can be set to trigger upon receipt of a request, a response, a specified request method, a response to a specified request method, a request made to a specified host (a specified request or every request), a request made for a specified URL (a specified request or every request), a specified status code (in response to any method or to a specified method), a response containing a status code within a specified category (in response to any method or to a specified method), a specified message header present in a request or a response, a message header with a specified value present in a request or a response, a specified HTTP version in a request or a response, a malformed HTTP request, and a malformed HTTP response.

Stream filters 37 can be employed to restrict the flow of information between the client 26 and the server 28. When a filter is set, only transactions that satisfy the filter criteria are forwarded from the proxy to the specified destination. Transactions that do not satisfy the filter criteria are filtered out. For example, an HTTP filter such as "Transaction Type=GET AND File Type=IMAGE AND File Size >20000" filters out GET requests for any image file that is larger than 20,000 bytes. A message is displayed to indicate that the GET request had been made, but the request is not forwarded to the server 28. A POP3 filter such as "If Transaction Type=RETR Then Discard Attachments" strips any MIME or UU encoded attachments from incoming mail messages, and sends the text portion of the message to the mail application associated with the client. Stream filters 37 can be set based on any combination of file type, file size, file date/time, breakpoint criteria, and View Filters.

View filters 39 can be employed to control the amount of information that is displayed during monitoring. View filters 39 only limit what is displayed, and do not affect the flow of data between the client 26 and the server 28. For example, an HTTP view filter such as "Transaction Type=POST" will filter everything except POST requests from being displayed. View filters 39 are defined with the same command syntax that is used to create stream filters.

Figure 3:
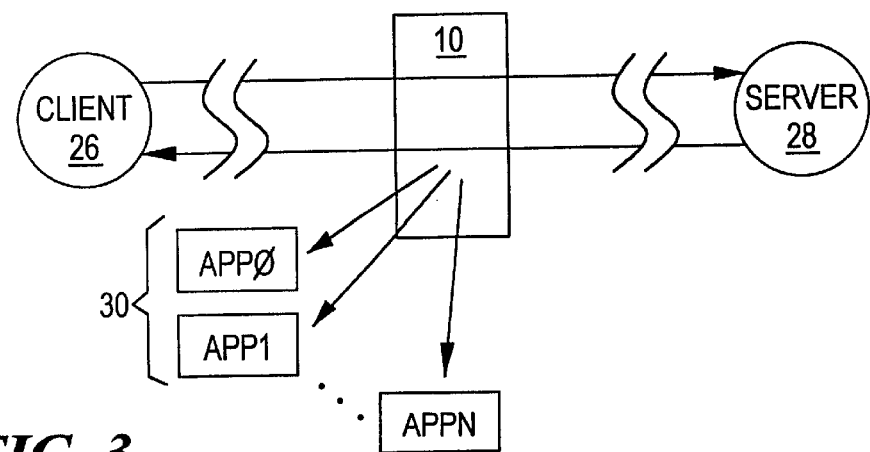
FIG. 3 is a block diagram that illustrates providing transaction records to selected applications.

Referring to FIG. 3, copies of transactions are selectively provided to at least one software application 30 in an active mode. In particular, the transaction logging application 14 (FIG. 1) maintains a record of each transaction that is captured by the active proxy. The transaction record is maintained at least until a copy of the transaction record is transmitted to a predetermined application 30. Transaction records can be sent to multiple applications if desired. The applications perform functions such as analysis based on the transaction records.

Figure 4:
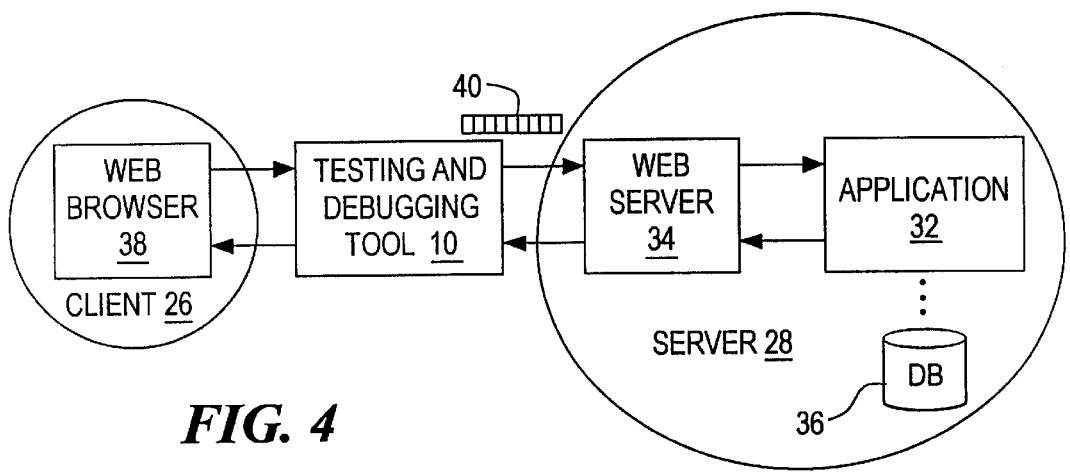
FIG. 4 is a block diagram that illustrates use of the software development tool with an online shopping cart application.

FIG. 4 illustrates an implementation of the testing and debugging tool 10 for analysis of an online store application 32 that employs a "shopping cart." The online store application 32 is associated with a web server application 34 and a database 36, both of which are associated with server device 28. A web browser 38 operating on client device 26 is employed to access the online store. The testing and debugging tool 10 is situated in the communication path between the web browser 38 and the web server 34. The shopping cart includes a record of items that have been selected for purchase via the browser 38. It is desirable to maintain a record of information associated with the transactions between the browser 38 and the web server 34, i.e., "state awareness," so that the status of the connection can be restored in the event that the connection between the web browser and the web server fails. For example, it is desirable to have a record of which items were selected for purchase before the connection to the online store fails. It is known to employ a "cookie" 40 to maintain state awareness. The cookie 40 is an encoded string that is generated by the online store application 32 and transmitted to the web browser 38. The cookie indicates state information. The web browser 38 stores the cookie 40. If the connection fails, the web browser contains the cookie 40 received from the online store application 32 when the connection is restored. The cookie is employed by the application 32 to restore the pre-failure state of the client/server session.

In the illustrated example, the testing and debugging tool 10 is employed to test the cookie 40 during development of the online store application 32. In particular, the cookie 40 is viewed en route from the web server 34 to the web browser 38, and also en route from the web browser to the web server. Further, the cookie can be modified en route without modifying the source code of the online store application 32.

Figure 5:
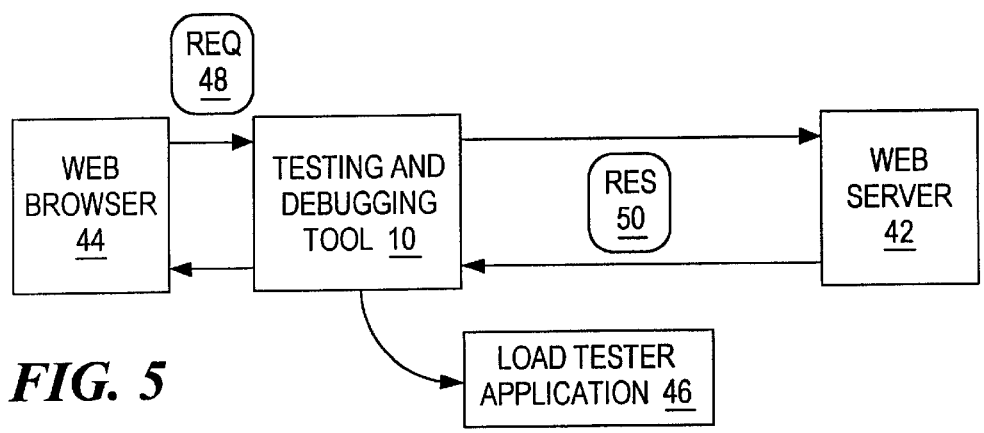
FIG. 5 is a block diagram that illustrates use of the software development tool with a load testing application.

FIG. 5 illustrates an implementation of the testing and debugging tool 10 for facilitating analysis of the performance of a web server 42. The testing and debugging tool 10 is situated in a communication path between a web browser 44 and the web server 42. A load testing application 46 is coupled to the testing and debugging tool 10. A request 48 is initiated at the web browser 44 and transmitted to the web server 42 via the testing and debugging tool 10. A response 50 to the request 48 is generated at the web server 42 and transmitted to the web browser 44 via the testing and debugging tool 10. A record of the request 48 and the corresponding response 50, together the "transaction," is transmitted to the load testing application 46 from the testing and debugging tool 10. The load testing application 46 analyzes the amount of time required to provide the response 50. Further, the load testing application 46 can generate multiple requests, based on the initial request 48, to analyze the response generating performance of the web server 42 as the number of requests received by the web server is increased.

Figure 6:
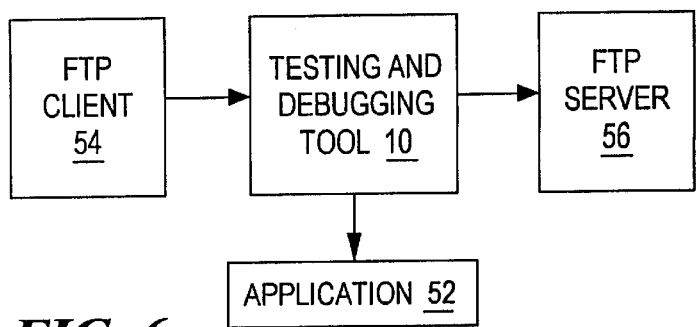
FIG. 6 is a block diagram that illustrates use of the software development tool with an error testing application.

FIG. 6 illustrates use of the testing and debugging tool 10 with an error testing application 52. The testing and debugging tool is situated in a communication path between an FTP client 54 and an FTP server 56. The error detecting application 52 is coupled to the testing and debugging tool 10. Data is periodically transmitted from the FTP client 54 to the FTP server 56 for analysis and storage. A record of each transaction between the FTP client and the FTP server is provided to the error detecting application 52 by the testing and debugging tool 10. In the event that an error is detected by application 52, such as a failure in the connection between the FTP client and the FTP server, action is prompted, such as activating a pager device.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. A software tool that facilitates development of an application that operates in a computer network having a first device that transits a data unit in a predetermined communication protocol and a second device, comprising:

at least one proxy having a distinct IP address that is configured for operation with the predetermined communication protocol, the first device transmits said data unit to said at least proxy at said IP address, said at least one proxy is operative to capture the data unit that is formatted in said predetermined protocol; and an editor that selectively modifies said data unit after said data unit is captured, wherein said proxy continues the transmission of said data unit toward the second device in said predetermined protocol.

2. The software tool of claim 1 further including a routine that displays information including a representation of the data unit that is captured by the proxy routine.

3. The software tool of claim 2 further including a view filter that prevents specified information from being displayed.

4. The software tool of claim 1 further including a stream filter that modifies said data unit based upon predetermined criteria.

5. The software tool of claim 1 further including a trigger function that interrupts transmission between the first device and the second device upon detection of a predetermined operational condition.

6. The software tool of claim 1 further including a routine that prompts transmission of a representation of the data unit to at least one selected application that is coupled with the software tool.

7. A method for testing an application that operates on a computer network having a first device and a second device comprising the steps of:

transmitting a data unit from the first device toward the second device via a proxy;

capturing the data unit with the proxy;

selectively modifying a portion of the data unit; and transmitting the modified data unit from the proxy toward the second device.

8. The method of claim 7 further including the step of displaying information that includes a representation of the data unit that is captured by the proxy.

9. The method of claim 8 further including the step of filtering the information prior to display.

10. The method of claim 7 further including the step of applying a filter to the data unit.

11. The method of claim 7 further including the step of interrupting transmission of the data unit between the first device and the second device upon the detection of a predetermined condition.

12. The method of claim 7 further including the step of providing a representation of the data unit that is captured by the proxy to at least one selected application.

13. A testing and debugging tool that facilitates development of a first application that operates on a first device in a computer network and is responsive to a second application that operates on a second device in the computer network, comprising:

at least one proxy that is associated with a predetermined network communication protocol and that is operative to receive a transaction request that are formatted in said predetermined protocol and transmitted from the second application toward the first application; and an editor that modifies said transaction request if desired and then prompts transmission of said transaction request toward said first application;

said at least one proxy being further operative to receive a transaction response that is formatted in said predetermined protocol and transmitted from the first application toward said second application in response to said transaction request, said editor being operative to modify said transaction response if desired and prompt transmission of said transaction response toward said second application, whereby the transaction comprising said request and said response is modifiable.

14. The software tool of claim 13 further including a routine that displays a representation of at least one of the transaction request and the transaction response.

15. The software tool of claim 14 further including a view filter that selectively filters information that is displayed.

16. The software tool of claim 13 further including a stream filter that selectively filters the transaction requests and responses.

17. The software tool of claim 13 further including a trigger that interrupts transmission between the first device and the second device upon the detection of a predetermined condition.

18. The software tool of claim 13 further including a routine that provides a representation of the transaction to a third application.

* * * * *